US010353386B2

(12) United States Patent
Wetegrove et al.

(10) Patent No.: US 10,353,386 B2
(45) Date of Patent: Jul. 16, 2019

(54) PORTABLE RADIO OPERATING UNIT FOR CONTROLLING A TRUCK

(71) Applicant: Jungheinrich Aktiengesellschaft, Hamburg (DE)

(72) Inventors: Ralf Wetegrove, Norderstedt (DE); Florian Grabbe, Hamburg (DE); Andreas Knie, Hamburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 7 days.

(21) Appl. No.: 15/356,963

(22) Filed: Nov. 21, 2016

(65) Prior Publication Data

US 2017/0153637 A1 Jun. 1, 2017

(30) Foreign Application Priority Data

Nov. 27, 2015 (DE) .................... 10 2015 120 687

(51) Int. Cl.
*G05D 1/00* (2006.01)
*G05D 3/00* (2006.01)
*G06F 7/00* (2006.01)
*G06F 17/00* (2019.01)
*G05D 1/02* (2006.01)
*B66F 9/075* (2006.01)
*H04W 4/80* (2018.01)
*H04L 29/08* (2006.01)

(52) U.S. Cl.
CPC ....... *G05D 1/0022* (2013.01); *B66F 9/07581* (2013.01); *G05D 1/021* (2013.01); *H04L 67/12* (2013.01); *H04W 4/80* (2018.02)

(58) Field of Classification Search
None
See application file for complete search history.

(56) References Cited

FOREIGN PATENT DOCUMENTS

| DE | 19855605 A1 | 6/2000 | |
|---|---|---|---|
| DE | 102009052079 A1 | 11/2009 | |
| DE | 102008025632 A1 | 12/2009 | |
| DE | 102015216482 A1 * | 3/2017 | ........... B62B 5/0076 |

OTHER PUBLICATIONS

DE 102015216482 A1 machine translation (Year: 2015).*
DE-102008025632-A1 machine translation (Year: 2009).*

* cited by examiner

*Primary Examiner* — Abby Y Lin
*Assistant Examiner* — Kenny A. Taveras
(74) *Attorney, Agent, or Firm* — Barclay Damon LLP

(57) ABSTRACT

A method for controlling an industrial truck equipped with a vehicle radio unit via a radio control unit that is portable and designed to transmit signals to the vehicle radio unit, which has a transmitter, a housing equipped with at least one control panel and an acceleration sensor arranged in the housing, wherein the method comprises the following steps:
  Detecting a momentum transfer to the control panel when an acceleration is captured entirely or partially in one direction,
  Forwarding the detected momentum transfer as a signal to the transmitter of the radio control unit and
  Transmitting the forwarded signal by the transmitter to the vehicle radio unit.

5 Claims, 1 Drawing Sheet

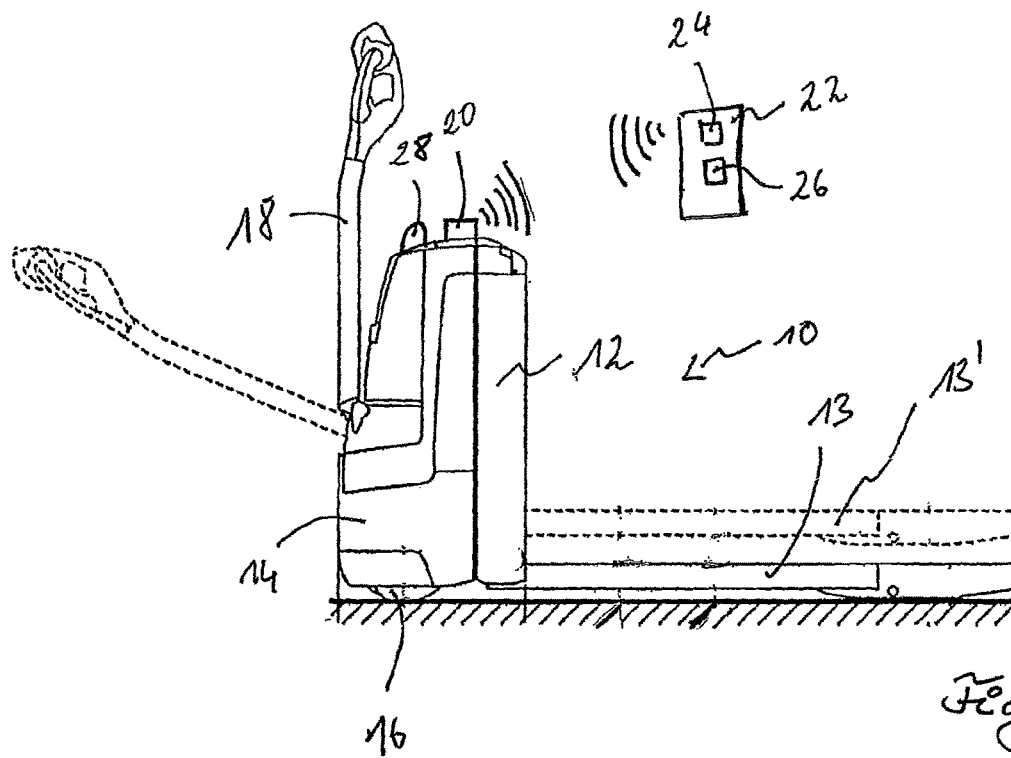
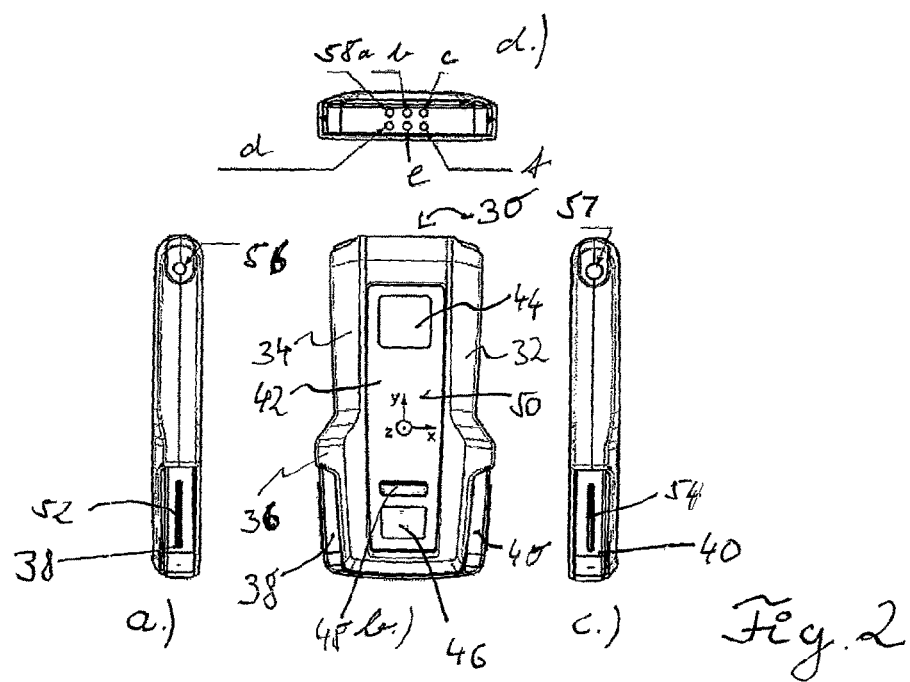

PORTABLE RADIO OPERATING UNIT FOR CONTROLLING A TRUCK

CROSS REFERENCE TO RELATED INVENTION

This application is based upon and claims priority to, under relevant sections of 35 U.S.C. § 119, German Patent Application No. 102015120687.0, filed Nov. 27, 2015, the entire contents of which are hereby incorporated by reference.

BACKGROUND

The present invention relates to a method for controlling an industrial truck via a radio control unit that is portable and designed to transmit signals to a vehicle radio unit. The invention also relates to a vehicle with a vehicle radio unit and a radio control unit designed to transmit signals to the vehicle radio unit.

The use of radio control units in industrial trucks is known. Radio control units are used for activities such as moving the vehicle to a pickup point or changing its height adjustment. Other usages for radio control units on industrial trucks are also known. A disadvantage of the known radio control units is that their operation restricts the vehicle driver's freedom of movement and/or sequences of movement. Even radio control systems, which are held or worn on the hand or on the pointer finger and can be operated by the thumb of the same hand, limit the ability of the hand to grip and distract the user from his sequence of movements.

The object of the invention is to provide a method for controlling an industrial truck and an industrial truck, which can be operated via a portable radio control unit remotely, without the vehicle driver being restricted or interrupted in his work and/or his work flows.

BRIEF SUMMARY OF THE INVENTION

A method according to the invention is provided and intended for controlling an industrial truck via a radio control unit that is portable and designed to transmit signals to a vehicle radio unit. The radio control unit has a transmitter, a housing equipped with at least one control panel, and an acceleration sensor arranged in the housing. T The method includes detecting a momentum transfer to the control panel. The momentum transfer to the control panel is present and detected when an acceleration is partially or entirely captured in one direction by the acceleration sensor. The direction in which the acceleration is captured, is aligned relative to the housing of the radio control unit. The known momentum transfer is then forwarded as a signal to the transmitter of the radio control unit. In a subsequent step, the transmitter transmits the forwarded signal to the preferably fixed vehicle radio unit. If a signal is mentioned in terms of the method according to the invention, it always refers to a signal regardless of its representation or encoding. This means that the signal forwarded to the transmitter can have a different representation or encoding than the signal sent by the transmitter to the vehicle radio unit. With the method according to the invention, it is possible that a vehicle driver generates relevant signals through one or more momentum transfers to the control panel for controlling the industrial truck and transmits them to the industrial truck. The momentum transfer can take place very quickly and easily, for example by tapping or light striking or knocking on the control panel so that the operator does not need to interrupt his work for long in order to generate a control signal. Operation via a momentum transfer is also very easy as the operator does not need to divert his eyes from his current activity in order to generate a signal on the radio control unit.

In one potential design, the acceleration sensor has at least one measurement axis, in the directions of which an acceleration can be captured. A momentum transfer to the control panel is detected when an amplitude of the known acceleration changes its sign. As a rule, acceleration sensors with six degrees of freedom are used, which can capture accelerations directed forwards and backwards. The strength of the acceleration applied over time is also called the amplitude of the acceleration, since the values recorded by the acceleration sensor show an oscillation-like progression. In order to differentiate between a momentum transfer to the control panel and a normal movement or respectively acceleration of the radio control unit, it is provided that a sign change of the amplitude must be present in order to qualify the captured signals as a momentum transfer to the control panel.

Furthermore, it has proven advantageous to detect a momentum transfer to the control panel only when the amplitude of the known acceleration exceeds a first predetermined minimum value in at least one direction of the measurement axis. It suffices here if the minimum value for the acceleration in one direction (i.e. with one sign) is exceeded. It can also be provided that a minimum value is provided respectively for the signals with positive and negative signs, which must be exceeded or respectively fallen short of, in order to detect a momentum transfer to the control panel.

In a preferred development, the momentum transfer to the control panel is detected when the amplitude in the normal direction of the control panel exceeds a second predetermined minimum value. This development is thus geared towards an acceleration value in the normal direction of the control panel. In the case of tapping or knocking on the radio control unit, the momentum transfer is assessed in the direction of the knock or respectively perpendicular to the control panel.

In an embodiment of the invention, a momentum transfer to the control panel is only detected when the amplitude in the normal direction of the control panel exceeds the second minimum value and the amplitude in at least one further direction does not exceed a predetermined third minimum value. It can hereby be determined that the momentum transfer took place mainly in the normal direction towards the control panel and portions in transverse directions are not too strong. For example, the crash of a falling radio control unit can create acceleration values in several directions, wherein its amplitude in these directions then also exceeds the predetermined third minimum value so that the crash is not assessed as a momentum transfer to the control panel.

In another embodiment, an assigned individual signal is transmitted to the vehicle radio unit in the case of a single momentum transfer to the control panel. In an embodiment, two momentum transfers to the control panel, which are separated by less than a predetermined time span, are given a double signal and transmitted to the vehicle radio unit. In this embodiment, two individual momentum transfers to the control panel are not transmitted to the vehicle radio unit as two individual signals but rather, if the time span between the two momentum transfers is small enough, an assigned double signal is transmitted to the vehicle radio unit. In this embodiment, even in the case of three or more momentum transfers to the control panel, if their temporal separation does not respectively exceed a specified minimum separation, an assigned triple signal or a signal of a higher order is transmitted to the vehicle radio unit. This embodiment also differentiates between whether three individual signals were generated or whether a triple signal is present due to the short temporal separation.

In an embodiment, the received signals from the radio control unit are forwarded from the vehicle radio unit to a vehicle controller. The vehicle controller converts the received signal so that for example a certain function is assigned to a double signal, for example the driving of the vehicle.

The object according to the invention is also solved by an industrial truck with a vehicle radio unit and a radio control unit that is portable and designed to transmit signals to the vehicle radio unit. The radio control unit has a transmitter, a housing equipped with at least one control panel and an acceleration sensor, which has at least one measurement axis, in the directions of which an acceleration can be sensed. The acceleration sensor is connected with the housing. A momentum transfer to the control panel effectuates an acceleration entirely or partially in the direction of the measurement axis. A sensed signal is forwarded to the transmitter and sent to the vehicle radio unit.

In another embodiment, a momentum transfer to the control panel is present when the amplitude of the signals changes its sign. The sign change makes it possible to differentiate safely and reliably between a knocking, tapping or other contact with the control panel and other random movements or jolts. The control panel is preferably designed in the portable radio control unit as fixed part of the housing so that the momentum transfer to the control panel leads to a vibration of the housing, which is measured by the acceleration sensor.

In an embodiment, the acceleration sensor detects a momentum transfer to the control panel when the amplitude of the acceleration sensor in the measurement axis exceeds a predetermined minimum value. This means that the vibration of the housing is strong enough to be assessed as a momentum transfer to the control panel.

In an embodiment, a three-dimensional acceleration sensor for six degrees of freedom is provided as the acceleration sensor. In technical terms, such an acceleration sensor is called a 6 DoF sensor, wherein DoF stands for degrees of freedom.

In an embodiment, a momentum transfer to the control panel is present when the amplitude in the normal direction of the control panel exceeds a first predetermined minimum value. The first predetermined minimum value is thereby set high enough such that accidental contact or jolts to the radio control unit cannot be assessed as a momentum transfer to the control panel for the generation of a control signal.

In another embodiment, a momentum transfer to the control panel is detected when the amplitude in the normal direction of the control panel exceeds the second minimum value and the amplitude in at least one further direction is less than a third minimum value. In a preferred development, the transmitter is designed to transmit an assigned signal to the vehicle radio unit in the case of a momentum transfer to the control panel.

The radio control unit according to the invention is also designed to detect a double momentum transfer to the control panel when two momentum transfers to the control panel are separated by no more than a predetermined time span. In the case of a double momentum transfer, the transmitter transmits an assigned signal to the vehicle radio unit. In an embodiment, the radio control unit is equipped with a control panel and at least one pair of pushbuttons. The radio control unit expediently transmits an assigned radio signal when both pushbuttons are pressed simultaneously. Accidental actuation is prevented by pressing the pushbuttons simultaneously. In an embodiment, the housing has two flat sides with the control panel arranged on the first flat side. The use of a flat side for the control panel makes it possible to generate a signal through a tapping or knocking movement on the control panel.

Furthermore, at least one pushbutton is provided on the first flat side, the actuation path and/or actuation force of which is determined such that a momentum transfer to the control panel cannot effectuate an accidental actuation of the pushbutton.

The pushbuttons with their actuation force and/or their actuation path are also designed such that a momentum transfer to the control panel does not take place when the pushbutton is pressed.

In an embodiment, a connection for an electrical plug connector is provided on the housing. For example, the connection can be provided for charging an internal battery.

In another embodiment, the radio control unit transmits data to the vehicle radio unit via a Bluetooth protocol.

BRIEF DESCRIPTION OF THE DRAWINGS

A preferred exemplary embodiment is explained in greater detail below based on the following exemplary embodiment. The figures show the following:

FIG. 1 illustrates an industrial truck according to the invention in a view from the side with a schematically represented radio control unit;

FIG. 2*a* illustrates a left side plan view of an embodiment of a radio control unit;

FIG. 2*b* illustrates a top plan view of the radio control unit of FIG. 2*a*;

FIG. 2*c* illustrates a right side plan view of the radio control unit of FIG. 2*a*; and FIG. 2*d* illustrates a front plan view of the radio control unit of FIG. 2*a*.

DETAILED DESCRIPTION OF THE INVENTION

FIG. 1 shows, in a view from the side, a low-lift truck 10, which has a load part 12 and a drive part 14. The load part 12 has two load arms 13, which can be lifted into a raised position 13'. The drive part 14 has a steering and driving wheel 16, the alignment of which is preselectable by the drawbar 18.

The vehicle shown in FIG. 1 has a vehicle radio unit 20 attached to the drive part 14 of the vehicle, which is in radio connection with a radio control unit 22. The radio control unit is schematically equipped with two control elements 24 and 26 in FIG. 1. If a control element on the radio control unit is actuated, then the corresponding actuation signal is transmitted by the radio control unit 22 and received by the vehicle radio unit 20. The received actuation signal is forwarded to a vehicle controller (not shown). Furthermore, an optical display unit 28 can be seen in FIG. 1, which displays in an easily visible manner by a light or flashing signal, that a radio connection was established between the vehicle radio unit 20 and the portable radio control unit 22. It can also be displayed via the display unit 28 that a signal was received.

FIG. 2b illustrates a top view of a radio control unit 30, while FIGS. 2a and 2c illustrate views from the side. FIG. 2d.) illustrates a front view of a radio control unit 30.

FIG. 2b shows a radio control unit 30 with an elongated, mainly rectangular housing 32. The housing 32 has a head section 34 and a wider body section 36. In the body section 36, two pushbuttons 38 and 40 are provided laterally. Each of the pushbuttons is independently actuatable by a pressing movement.

A recessed area 42 is provided on a flat side in FIG. 2b, which has a pushbutton 44 on its head-side end and a second pushbutton 46 on its body-side end. When actuated, these pushbuttons trigger the transmission of assigned signals, which are converted in the vehicle controller to trigger different vehicle functions, for example lifting and lowering of the load pickup means. The body-side pushbutton 46 is separated from the rest of the recessed area 42 by a button sill 48. With the help of the button sill 48, the user can orient himself and differentiate between the pushbuttons 44 and 46. A control panel 50 is provided in the area between the button sill 48 and the pushbutton 44. As shown, the control panel 50 is designed as a fixed part of the housing and positioned in the recessed area 42. The normal direction of the control panel 50 points in the Z direction, as the sketched-in coordinate system shows.

The pushbuttons 38 and 40 can be seen in FIGS. 2a and 2c. Each of the pushbuttons 38, 40 has a button projection 52, 54 extending in the longitudinal direction of the pushbutton, allowing the position of the pushbutton to be palpated. An LED 56 as an illuminating means can be seen in FIG. 2a on the head-side end of the side sections. Referring to FIG. 2c, an emergency stop button 57 is positioned on the opposite-lying side from the LED 56. The movement of the industrial truck can be stopped immediately and without delay via the emergency stop button.

As shown in FIG. 2d, six electrical connections are provided on the front side. The connections can be provided, for example, in order to charge a battery provided in the radio control unit. Other connections can also be provided to generate other commands for a transmitter provided in the radio control unit. The six connections 58a-58f can be provided individually or in a corresponding plug connector socket.

The radio control unit 30 is operated for example by double-tapping on the control panel 50 with a flat hand, the inside of the finger or a finger tip. Each tap on the control panel 50 results in a momentum transfer, which is captured by an internal acceleration sensor and a corresponding transmission signal is generated as momentum transfer to the control panel. The momentum transfer to the control panel preferably takes place in the direction of the Z axis, i.e. in the normal direction of the control panel 50. At the control panel 50, a differentiation is possible for example between a double and a triple momentum transfer, in order to transmit corresponding signals by radio to the controlled industrial truck.

The industrial truck then moves a defined distance, the length of which can be parameterized. For this, corresponding and adjustable parameters can be provided in the software of the controller.

REFERENCE NUMBER LIST

10 Low-lift truck
12 Load part
13 Load arms
13' Load arms
14 Drive part
16 Driven wheel
18 Drawbar
20 Vehicle radio unit
22 Radio control unit
24 Control element
26 Control element
28 Display unit
30 Radio control unit
32 Housing
34 Head section
36 Body section
38 Pushbutton
40 Pushbutton
42 Recessed area
44 Pushbutton
46 Pushbutton
48 Button sill
50 Control panel
52 Button projection
54 Button projection
56 LED
57 Emergency stop button
58a-f Connections

The invention claimed is:

1. A method for controlling an industrial truck equipped with a vehicle radio unit using a portable radio unit, the method comprising:
   detecting, using an acceleration sensor, a momentum transfer to a control panel of a radio control unit, wherein the acceleration sensor has at least one measurement axis in a direction of which an acceleration can be captured;
   generating a signal from the acceleration sensor in response to the detected momentum transfer;
   sending the signal to a transmitter of the portable radio control unit; and
   transmitting the signal by the transmitter to a vehicle control unit,
   wherein the momentum transfer to the control panel is detected when at least one of the amplitude of the acceleration changes its sign, the amplitude of the acceleration in at least one direction of the measurement axis exceeds a first predetermined value, the amplitude in a normal direction of the control panel exceeds a second predetermined value, and the amplitude in the normal direction of the control panel exceeds the second predetermined minimum value and the amplitude in at least one other direction does not exceed a third predetermined minimum value.

2. The method according to claim 1, wherein an assigned individual signal is transmitted to the vehicle radio unit when an individual momentum transfer to the control panel is detected.

3. The method according to claim 1, wherein an assigned double signal is transmitted to the vehicle radio unit when two momentum transfers to the control panel which are separated by less than a predetermined time span are detected.

4. The method according to claim 1, wherein an assigned triple signal or a signal of higher order is transmitted to the vehicle radio unit when three or more momentum transfers to the control panel are detected, and wherein a temporal separation of which does not respectively exceed a specified minimum time span.

5. The method according to claim 1, wherein signals received by the vehicle radio unit are forwarded to a vehicle controller.

\* \* \* \* \*